R. E. WALKER.
SPRING FRAME FOR MOTORCYCLES.
APPLICATION FILED FEB. 2, 1920.
1,340,508.
Patented May 18, 1920.
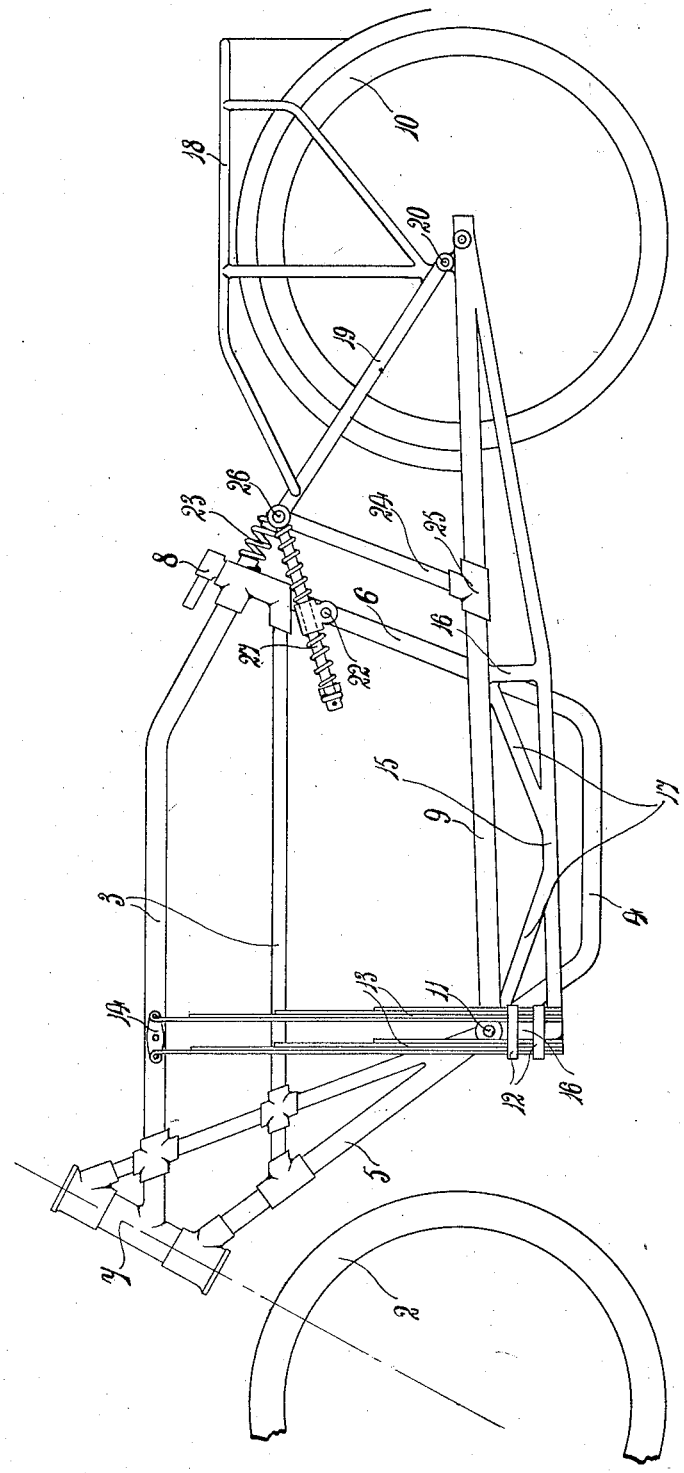

UNITED STATES PATENT OFFICE.

REGINALD ERIC WALKER, OF TYSELEY, BIRMINGHAM, ENGLAND.

SPRING-FRAME FOR MOTORCYCLES.

1,340,508.      Specification of Letters Patent.      Patented May 18, 1920.

Application filed February 2, 1920. Serial No. 355,870.

*To all whom it may concern:*

Be it known that I, REGINALD ERIC WALKER, a subject of the King of Great Britain, residing at King's Road, Tyseley, Birmingham, in the county of Warwick, England, have invented certain new and useful Improvements in and Relating to Spring-Frames for Motor cycles; and I do hereby declare the following to be a full, clear, and exact description of the same.

This invention relates to motor cycles wherein a separate rear frame, carrying the power unit including the engine and rear wheel, is pivoted to the main frame and has a restrained turning movement about said pivot controlled by springs.

According to the present invention the movement of the rear frame is restrained by one or more laminated springs secured to the rear frame adjacent to the pivot, the free end of said spring or springs engaging with the main frame or a member carried thereon whereby movements of the rear wheel axle are transmitted to the springs at a reduced leverage and whereby any side play allowed by the pivot will not seriously affect the springs.

Another advantage gained by locating the spring or springs adjacent the pivot is that they are well clear of the wheels and less likely to be fouled by mud thrown up thereby.

Referring to the drawing in which the figure illustrates a side view of a motor cycle constructed in accordance with the invention, the main frame of the cycle carries the front wheel 2 and the saddle (not shown) and it comprises one or two substantially horizontal upper members 3 and a substantially horizontal lower member 4, the frame being completed by upwardly inclined members 5, 6 from the lower horizontal member to the steering fork bearing 7 and to the seat pillar 8.

The power unit is carried by a rigid frame comprising a pair of girders 9 which may be of tubular construction or of pressed steel extending from the hub of the rear wheel 10 to the lower forward portion of the main frame, one girder being disposed on each side. These girders are mounted on a pivot 11 carried by the lower forward portion of the main frame. Secured adjacent the pivot 11 to the forward end of each of these girders by two or more spaced clips 12 are a pair of laminated springs 13 which pass upwardly to a link 14 which is pivoted or otherwise attached to one of the upper members of the main frame. In all there may be four of these laminated springs two carried by each of the girders carrying the power unit. If required the two forward laminated springs may be of different strength from the rear two, the object being that one pair of springs will have a damping action upon the other pair.

It will be understood that the two girders carrying the power unit will be joined together at intervals by transverse struts, and each girder may consist of an upper compression member 9 and a lower tension member 15 with struts 16 and diagonal members 17 between them. This pair of girders together with the transverse members between them comprises a rigid frame which carries the engine, transmission, including gear box if used, and the rear wheel.

It will be understood that the rear wheel has a restricted pivotal movement about the forward end of the frame carrying it, the said movement being restricted by the springs provided, but any such movement will not affect the tension in the driving belt or chain or the alinement of the transmission shaft as both the driving and driven pulleys or wheels are carried by the same rigid frame.

A luggage carrier 18 may be attached to a member 19 of a triangular frame the other sides of which are the girders 9 of the frame carrying the power unit and the members 24. The members 19 and 24 are fixed to the frame carrying the power unit at 20 and 25 respectively and secured to each other at 26. A pair of resilient extensible links of well known construction as shown at 27 are provided pivoted to the main frame at 22 and to the triangular frame at 26, spiral or other suitable springs 23 being interposed between the main frame and the joint between the members 19 and 24. The links 27 are disposed one on each side of the frame member 6.

What I claim then is:—

1. In a motor cycle the combination of a main frame and a rear frame pivotally secured thereto, a pair of separate plate springs of different strengths secured to said rear frame adjacent the pivot, one end of each plate spring engaging with an abutment upon the main frame.

2. In a motor cycle the combination of a main frame and a power-unit carrying rear frame pivotally secured to the forward part of the main frame, said rear frame comprising two girders, each girder comprising an upper compression member and a lower tension member with intervening connecting members, and a laminated plate spring having its maximum cross section at one end and tapering to the other end, said spring being rigidly secured at its thicker end to said rear frame at a point adjacent the pivot, the other end of the spring engaging with an abutment upon the main frame.

3. In a motor cycle the combination of a main frame and a rear frame pivotally secured thereto, said rear frame comprising two girders, each girder comprising an upper compression member and a lower tension member with intervening connecting members, a pair of separate plate springs of different strengths secured to said rear frame one in front of and the other in rear of the pivot, one end of each plate spring engaging with an abutment upon the main frame.

4. In a motor cycle the combination of a main frame and a rear frame pivotally secured thereto, a triangular structure at the rear end of said rear frame, a link pivotally secured to said structure and slidably and pivotally connected to the main frame, and a plate spring secured to the rear frame adjacent the pivot, one end of the plate spring engaging with an abutment upon the main frame.

5. In a motor cycle the combination of a main frame and a rear frame pivotally secured thereto, a triangular structure at the rear end of said rear frame, a cushioned link pivotally secured to said structure and slidably and pivotally connected to the main frame, a pair of separate plate springs of different strengths, secured to said rear frame adjacent the pivot, one end of each plate spring engaging with an abutment upon the main frame.

6. In a motor cycle the combination of a main frame and a rear frame pivotally secured thereto, a triangular structure at the rear end of said rear frame, a cushioned link pivotally secured to said structure and pivotally and slidably connected to the main frame, a spring interposed between said structure and the main frame, and a plate spring secured to said rear frame adjacent the pivot, one end of said plate spring engaging with an abutment upon the main frame.

7. In a motor cycle the combination of a main frame and a rear frame pivotally secured thereto, a triangular structure at the rear end of said rear frame, an extensible and contractible link pivotally secured to said structure and to the main frame, a spring interposed between said structure and the main frame, a pair of separate plate springs of different strengths secured to said rear frame adjacent the pivot, one end of each plate spring engaging with an abutment upon the main frame.

8. In a motor cycle the combination of a main frame and a rear frame pivotally secured thereto, said rear frame comprising two girders joined together at intervals, each girder comprising an upper compression member and a lower tension member with intervening connecting members, a triangular structure at the rear end of said rear frame, an extensible and contractible link pivotally secured to said structure and to the main frame, a spring interposed between said structure and the main frame, a pair of separate plate springs of different strengths secured to said rear frame adjacent the pivot, one end of each plate spring engaging with an abutment upon the main frame.

9. In a motor cycle the combination of a main frame and a rear frame pivotally secured thereto, a pair of separate plate springs of different strengths secured to said rear frame adjacent the pivot, one spring in advance of the pivot and the other to the rear of the pivot, one end of each plate spring engaging with an abutment upon the main frame.

10. In a motor cycle the combination of a main frame and a rear frame pivotally secured thereto, a triangular structure at the rear end of said rear frame, an extensible and contractible link pivotally secured to said structure and to the main frame, a pair of separate plate springs of different strengths secured to said rear frame adjacent the pivot, one spring in advance of the pivot and the other to the rear of the pivot, one end of each plate spring engaging with an abutment upon the main frame.

In testimony whereof I affix my signature.

REGINALD ERIC WALKER.